(12) United States Patent
Mühlherr et al.

(10) Patent No.: US 9,332,772 B2
(45) Date of Patent: May 10, 2016

(54) METHOD AND DEVICE FOR DRYING GOODS

(75) Inventors: Christian Mühlherr, Constance (DE); Kurt Lieberherr, Wil (CH)

(73) Assignee: Bühler AG, Uzwil (CH)

( * ) Notice: Subject to any disclaimer, the term of this patent is extended or adjusted under 35 U.S.C. 154(b) by 1101 days.

(21) Appl. No.: 13/148,803

(22) PCT Filed: Mar. 15, 2010

(86) PCT No.: PCT/EP2010/053279
§ 371 (c)(1),
(2), (4) Date: Aug. 10, 2011

(87) PCT Pub. No.: WO2010/108806
PCT Pub. Date: Sep. 30, 2010

(65) Prior Publication Data
US 2012/0000090 A1    Jan. 5, 2012

(30) Foreign Application Priority Data
Mar. 23, 2009    (DE) .......................... 10 2009 014 020

(51) Int. Cl.
*F26B 3/00* (2006.01)
*F26B 7/00* (2006.01)
*A23L 1/16* (2006.01)
(Continued)

(52) U.S. Cl.
CPC ................. *A23L 1/16* (2013.01); *F26B 15/126* (2013.01); *F26B 21/06* (2013.01); *F26B 23/002* (2013.01); *F26B 2210/06* (2013.01); *Y02P 70/405* (2015.11)

(58) Field of Classification Search
CPC . A23L 1/1613; F26B 15/126; F26B 2210/06; F26B 2210/08
USPC ........... 34/423, 504, 514, 443, 510, 497, 506, 34/493, 201; 426/640, 622, 451, 443
See application file for complete search history.

(56) References Cited

U.S. PATENT DOCUMENTS 1,551,818 A     9/1925 Garnsey
4,197,190 A *  4/1980 Foster ........................... 208/187
(Continued)

FOREIGN PATENT DOCUMENTS

DE    69211051    10/1992
DE    4424846    8/1995
(Continued)

*Primary Examiner* — Kenneth Rinehart
*Assistant Examiner* — John McCormack
(74) *Attorney, Agent, or Firm* — Davis & Bujold, P.L.L.C.; Michael J. Bujold

(57) ABSTRACT

By means of the invention, a method and an apparatus (1) for the drying of goods, in particular for the convection drying of pastas, which are introduced from a first treatment zone (2) into a second treatment zone (3), are to be improved to the effect that the drying process has a lower energy consumption than conventional dryers and the surroundings of the dryer (1) are polluted only slightly by waste heat. Furthermore, the dryer (1) is to be designed in a structurally simple and cost-effective way. This object is achieved by means of a method for the drying of goods, in which the temperature in the first treatment zone (2) is on average lower than in the second treatment zone (3), and in which the energy obtained from the exhaust air of the first and/or the second treatment zone (2, 3) in at least one heat exchanger (6, 7, 8, 9, 10, 11) is introduced into the first treatment zone (2).

13 Claims, 1 Drawing Sheet

(51) Int. Cl.
*F26B 15/12* (2006.01)
*F26B 21/06* (2006.01)
*F26B 23/00* (2006.01)

(56) References Cited

U.S. PATENT DOCUMENTS

| | | | |
|---|---|---|---|
| 4,473,593 A | | 9/1984 | Sturgeon |
| 5,026,567 A | * | 6/1991 | Manser et al. ................. 426/458 |
| 5,347,729 A | * | 9/1994 | Meyer ............................. 34/180 |
| 5,473,825 A | * | 12/1995 | Conselvan et al. ............. 34/389 |
| 2006/0168842 A1 | * | 8/2006 | Sprague .......................... 34/396 |
| 2008/0271335 A1 | * | 11/2008 | Kimball ............................ 34/79 |
| 2010/0031820 A1 | * | 2/2010 | Minkkinen ..................... 95/126 |
| 2010/0088920 A1 | * | 4/2010 | LaRou ............................ 34/255 |
| 2011/0117260 A1 | * | 5/2011 | Zamprogna et al. .......... 426/557 |

FOREIGN PATENT DOCUMENTS

| | | |
|---|---|---|
| DE | 3546066 | 7/1996 |
| DE | 102008002334 | 12/2009 |
| EP | 510342 | 10/1992 |
| WO | WO 2009011607 A2 * | 1/2009 |
| WO | 2009/150192 | 12/2009 |

* cited by examiner

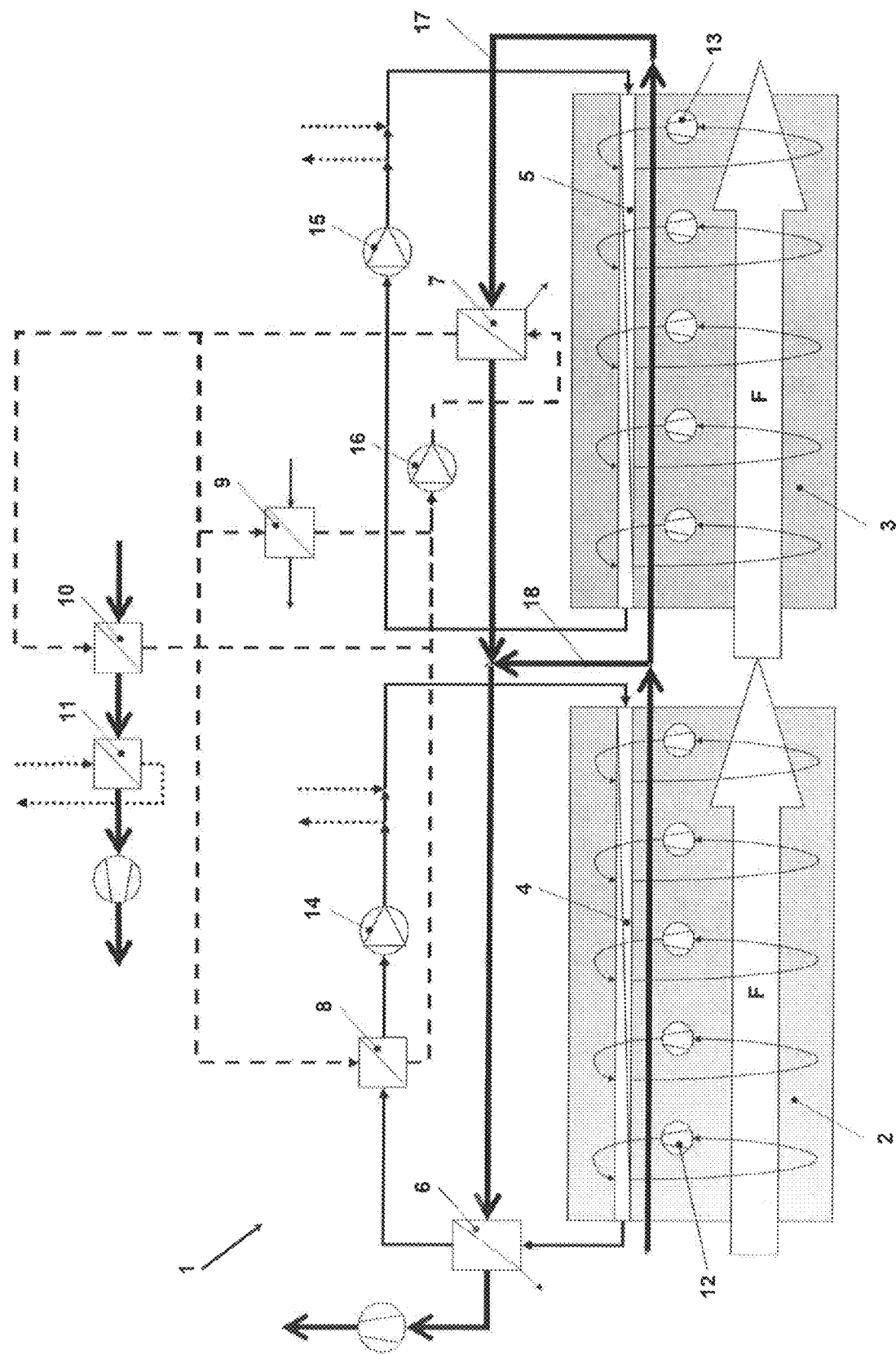

METHOD AND DEVICE FOR DRYING GOODS

The invention relates to a method for the drying of goods, in particular for the convection drying of pastas, the goods being introduced from a first treatment zone into a second treatment zone. The invention relates, furthermore, to an apparatus for the drying of goods, in particular for the convection drying of pastas, having at least two treatment zones through which the goods are transported.

Pastas, in particular long products, such as, for example, spaghetti, leave a press head in the form of soft moistly plastic dough strands and are led, suspended, through differently heated treatment zones up to final drying and, after the conclusion of the drying operation, are introduced into a stabilization zone, a moistening zone or a cooling zone and dimensionally stabilized. During the drying operation, the extraction of water from the pastas is to be controlled such that drying proceeds from the outside inward, so that the surface does not harden before the core in order to avoid cracks and clefts in the finished pasta. That is to say, the surface should not harden before the core, and the moisture gradient between the layers is to remain limited. The drying of the formed long products is the last and the technically most demanding section in the production of long products. Drying at too high an air temperature, with too low relative atmospheric moisture and with excessive air circulation causes shrinkage stresses which may later give rise to cracks, clefts and breaks and also disintegration of the dry pastas or disintegration during cooking.

For the drying of pastas, convection dryers are used in practice, the drying conditions, that is to say the temperature and relative moisture of the drying medium (air), varying over the dryer length. The dryer is subdivided into treatment zones. Apparatuses constructed in this way consume a large amount of energy and time for the drying process. Since the treatment zones are set up in a line, the plants for this drying process require very large installation areas in the production spaces.

A method of this type is also known from the document EP 0 129 892 B1. A drying plant is composed of a first treatment zone, a rapid heating zone, having a first treatment zone or climate zone in which the product is heated as quickly as possible. This is followed by a transpiration period lasting several hours, in which the residual water is distributed uniformly from the core of the product over the entire cross section. The subsequent drying takes place more slowly and more carefully than the predrying in a second treatment zone, an intensive drying zone, having a second climate zone. The product is heated in the first treatment zone for a duration of between 15 and 30 minutes, and under the action of a heating medium with a relative moisture of 60 to 85%, to a temperature of more than 80° C. In the second treatment zone, the product is dried under the action of a drying medium with a temperature of more than 80° C. and with a relative moisture of 65 to 85% to a moisture content of about 14% by weight. To avoid undesirable reactions, the product may first be dried at more than 80° C. to a moisture content of less than 18% by weight and then at a low temperature to a final moisture content of less than 14% by weight. In this drying method, however, the pasta to be dried is not in a rubber-like state over the entire cross section, but only in the core, while the surface of the pasta is already in a glass-like state during the drying operation. A relatively long stabilization phase is therefore necessary in order to reduce moisture gradients or stresses in the pastas which have occurred. This necessitates an additional prolongation of the production time.

The document DE 44 24 846 A1 discloses a dryer for plastic granulate, in which the dry supply air, before entering a reservoir, is led past a heat exchanger. The heated and moisture-laden return air flowing into a return air line transmits part of the heat via the heat exchanger to the supply air. A heating device heats the dry air to the temperature required for the drying operation, before it enters the reservoir which already contains the goods to be dried. The return air flowing into the return air line heats the dry air delivered via the dry supply air line, so that correspondingly less heating energy has to be supplied via the heating device. The structural set-up of this apparatus allows only restricted heat recovery.

The object on which the invention is based is to improve a method and an apparatus of the generic type initially mentioned, to the effect that the dryer is constructed in a structurally simple, cost-effective and space-saving way and the drying process can be conducted efficiently.

This object is achieved, according to the invention, by a method having the features of the present invention.

On the average, the temperature is lower over the first treatment zone than in the second treatment zone, and the energy obtained from the exhaust air of the first and/or the second treatment zone in at least one outer heat exchanger arranged outside the treatment zones is introduced at least partially into the first treatment zone. As a result, in terms of the thermal heating capacity, an energy saving for the entire drying method of approximately 60% is possible, as compared with the conventional method. Furthermore, this drying method affords the advantage that the drying of the goods, particularly the convection drying of pastas, proceeds from the outside inward such that the surface does not harden before the core and therefore cracks and clefts in the goods are avoided.

The entire surface of the pastas to be dried preferably remains in a rubber-like state. As a result, not only the extent of shrinkage stresses, but also the occurrence of Maillard reactions during the drying operation can be reduced. See, in this respect, also patent applications DE 10 2008 002 334 and WO 2009/150192 by the same applicant, which are incorporated in the present description by reference. This has an especially positive effect upon the cooking properties and discolorations of the pastas.

In the method, described in WO 2009/150192, for the drying of pastas, the pastas present as raw dough structures pass during the drying operation through states on the surface which have different pairs of values of the temperature of the surface and the moisture of the surface. In this case, the temperature of the surface of the raw dough structure can lie not more than 40° C. above the temperature on the glass transition curve of the raw dough at the point of equal moisture of the surface. Correspondingly, in the method according to the invention, too, the temperature in the second treatment zone can lie not more than 40° C. above the temperature on the glass transition curve at the point of equal moisture of the surfaces. Even with this restriction in temperature, it is beneficial to introduce into the first treatment zone the energy which has been obtained by means of the outer heat exchanger.

Advantageously, a drying medium, in particular air, in the first and/or the second treatment zone is led past at least one inner heat exchanger arranged in the treatment zone and is heated. This drying medium dries the goods which are introduced from a first treatment zone into the second treatment zone. The inner heat exchanger makes it possible to transfer the energy obtained from other method steps to the drying medium. This leads to an energy saving in the method as a whole.

It is conceivable that the goods are led through more than two treatment zones in order to adapt the drying process to specific requirements.

In a beneficial exemplary embodiment, in the first treatment zone, in the product flow direction, the temperature of the drying medium can rise, the temperature of the goods and the absolute moisture of the drying medium can rise and the water content of the goods can fall. Minor jumps in temperature within the treatment zone can prevent the pastas to be dried from sticking together.

In a further embodiment, in the second treatment zone, in the product flow direction, the temperature of the drying medium can be varied, the temperature, in particular, rising. Furthermore, the temperature of the goods and the absolute moisture of the drying medium can rise, and the water content of the goods can fall. By the temperature of the drying medium being adapted, it is possible, during the entire drying process, to keep the pastas to be dried within a temperature range optimal for fulfilling the quality requirements.

In an especially advantageous embodiment of the present invention, a higher temperature may prevail at the end of the first treatment zone than at the start of the first treatment zone. Furthermore, a lower or equally high or higher temperature may prevail at the end of the second treatment zone than at the start of the second treatment zone. This procedure ensures a process for drying the pastas which is aimed at the product quality. A different temperature profile may be employed, depending on the desired product quality (color, cooking properties, etc.), on the type and nature of the raw materials used (hard semolina, soft wheat flour, etc.) and on the additives administered (eggs, tomato powder, spinach powder, etc.).

In order to recover the heat energy in the treatment zones, the at least one inner heat exchanger in the first treatment zone may be supplied with water which is heated via at least one outer heat exchanger by the exhaust air of the first and/or the second treatment zone. Especially efficient energy recovery within the process is thereby possible.

It is conceivable to admix conventionally heated, that is to say hotter water to the water which is supplied to the inner heat exchangers in the first and/or the second treatment zone, in order thereby to increase the heat transferred to the drying medium by the inner heat exchangers in the treatment zones. The temperature in the respective regions of the treatment zones rises as a result.

It is conceivable that the energy present in the first and/or the second treatment zone heats the feed water required for dough preparation and/or further zones of the dryer, in particular of a hanger. There is therefore no need for the external supply of energy in these regions.

In a further embodiment of the present invention, the goods leaving the main dryer may be introduced into a stabilization zone and/or moistening zone and/or cooling zone. In these zones, the goods, in particular pastas, can be prepared optimally for the subsequent storage process.

The inner heat exchangers arranged in the first and/or the second treatment zone are connected in series and have a fluid, in particular water, flowing through them counter to the product flow direction. The temperature of the last regions of the treatment zones in the product flow direction then has a higher temperature than the first regions. That is to say, the goods likewise have higher temperatures in these regions.

The temperature jumps between areas in the first and/or the second treatment zone are only small and are assigned to the successive inner heat exchangers in the treatment zones. In particular, these temperature jumps are no greater than 12° C., preferably no greater than 8° C., and especially preferably no greater than 4° C. The small temperature jumps prevent the goods led through the treatment zones from sticking together during the drying process.

The fresh air supplied to the second treatment zone may be extracted at least partially from the exhaust air of the first treatment zone. The exhaust air is preferably sucked away from the first treatment zone at its end, since it has the highest temperature in this area and there is a high potential for recovering this energy. By the exhaust air being sucked away from the first treatment zone, the relative atmospheric moisture at least in the last area of the first treatment zone in the product flow direction is regulated or controlled.

At least in the last area of the second treatment zone in the product flow direction, the relative atmospheric moisture may be regulated and/or controlled. This may take place by the exhaust air being sucked away from the second treatment zone.

The object initially mentioned is achieved, furthermore, by an apparatus having the features of the present invention.

At least one inner heat exchanger is arranged in each case in the first and/or in the second and/or in the plurality of treatment zones. This inner heat exchanger is a water/air heat exchanger. The inner heat exchangers arranged in the treatment zones make it possible to transfer the energy recovered from the exhaust air or wastewater by means of outer heat exchangers arranged outside the treatment zones into the drying process. A major saving of the energy to be supplied from outside for the drying process is thereby achieved.

In an especially advantageous embodiment of the invention, the first of the two treatment zones is a heating zone and the second treatment zone is a drying zone. The goods to be dried experience in these two zones different treatment temperatures which can be adapted to the required product quality.

The first and/or the second treatment zone may have in each case at least one inner heat exchanger or a plurality of inner heat exchangers arranged in series. The inner heat exchangers transfer the heat recovered from the drying processes to the drying medium. A plurality of inner heat exchangers arranged in series make it possible to have optimally small temperature jumps from one inner heat exchanger to the next inner heat exchanger, with the result that the pastas can be prevented from sticking together in this region of the drying process.

In a beneficial embodiment, at least one outer heat exchanger may follow the first and/or the second treatment zone, in order to absorb the heat or energy present in the treatment zone and enable it to be recovered.

In a variant of the invention, the exhaust air discharged from the first treatment zone and/or the second treatment zone may be processed in the outer heat exchanger or outer heat exchangers, the energy obtained in the outer heat exchanger being recirculatable into the inner heat exchanger or inner heat exchangers of the first and/or the second treatment zone. The outer heat exchanger thus makes it possible to recover the energy present in the treatment zones. The energy saving in the plant as a whole can thereby be increased by means of the recovery of heat.

The apparatus is advantageously designed in such a way that the fresh air to be supplied to the second treatment zone can be extracted from the exhaust air of the first treatment zone. The exhaust air is preferably sucked away from the end of the first treatment zone, since it has the highest temperature here and allows the greatest possible energy recovery.

By the exhaust air being sucked away from the first treatment zone, the relative atmospheric moisture at least in the last area of the first treatment zone in the product flow direction can be regulated and/or controlled.

Further advantages for energy recovery arise when the relative atmospheric moisture at least in the last area of the second treatment zone in the product flow direction can be regulated and/or controlled by the exhaust air being sucked away from the second treatment zone.

Further advantageous developments of the invention are defined in the subclaims.

A preferred embodiment of the present invention is now explained with the aid of the drawing FIGURE, showing a conceptual sketch of the apparatus.

The present invention makes it possible to dry pastas while their entire cross section is in a rubber-like state, the glass transition temperature of wheat starch and wheat protein in the pastas being taken into account. This glass transition temperature describes a range in which the transition from the rubber-like to the glass-like state takes place. During the method, the parameters of the drying conditions are selected such that the surfaces of the pastas also remain in the rubber-like state during the entire drying process. Drying can thereby be accelerated, since the moisture diffusion of the water bound in the pastas is higher in the rubber-like state than the in glass-like state. Moreover, the stabilization phase following the drying process can be shortened, since the stresses in the pastas can be broken down more effectively in the rubber-like state.

The method for the drying of goods, in particular for the convection drying of pastas, takes place in a dryer 1 which is composed of at least two treatment zones 2, 3. The first treatment zone 2 is a heating zone and the second treatment zone 3 is a main dryer. Furthermore, the dryer has a stabilization zone, a moistening zone and a cooling zone. Inside the treatment zones 2, 3 are arranged a plurality of heat exchangers 4, 5 which are designated hereafter by the "inner heat exchangers". The heat exchangers arranged outside the treatment zones 2, 3 in the apparatus 1 are designated by "outer heat exchangers" 6, 7, 8, 9, 10, 11.

In the dryer 1, long products, that is to say spaghetti, are dried, which, after leaving a press head, are led on a bar hanger device through the dryer 1. In the first treatment zone 2, the heating zone, the pastas are heated and dried continuously from approximately 40° C. and approximately 28% H2O to approximately 70 to 90° C. and preferably to 75° C. and 20% H2O. This heating zone 2 has a plurality of inner water/air heat exchangers, hereafter inner heat exchangers 4, in series, with the result that the drying medium, for example air, continuously following the product flow F, is heated continuously from approximately 42° C. and 80% relative moisture to approximately 80° C. and 80% relative moisture. Small temperature jumps are made possible by the plurality of inner heat exchangers 4 arranged in series.

The forward run of the heating zone 2, that is to say the heating water upstream of the inner water/air heat exchangers 4 of the last element or area of the heating zone 2 in the product conveying direction F, has the highest temperature. This temperature lies between 75 and 95° C. and preferably at approximately 84° C. This temperature is furnished by a plurality of energy streams:

1. The water of the return run of the heating zone 2, that is to say the heating water downstream of the inner water/air heat exchangers 4, is heated by an outer air/water heat exchanger 6 and then by an outer water/water heat exchanger 8.

2. The exhaust air 17 of the main dryer 3 is used for heating the water which acquires a temperature of approximately 80° C. via an air/water heat exchanger 7 and a water/water heat exchanger 8, and 3. in order to achieve the required forward run temperature of the heating zone 2, that is to say the heating water upstream of the water/air heat exchangers 4, additional hot water at a temperature of approximately 130° C. is supplied and is mixed with the water having a temperature of approximately 80° C.

The heating water flows through the heating zone 2, counter to the product flow F, through the inner water/air heat exchangers 4 which are connected in series. A plurality of fans 12 move the drying medium, the air, which is heated continuously by the series-connected inner heat exchangers 4. The inner heat exchangers 4 are dimensioned such that the required heating capacity can be exchanged by means of minor temperature differences between the water and air. The series connection of the inner heat exchangers gives rise, in the case of a small flow of water, to a high temperature difference of the heating water. This affords a relatively low return run temperature.

The required fresh air 18 is preferably sucked directly out of a hanger into the dryer 1. Since, at the end of the heating zone 2, part of the exhaust air is sucked away from the dryer 1 in a regulated way, the relative atmospheric moisture in the last area is regulated. The water for heating the heating zone 2 is constantly circulated by means of a pump 14. The temperature in the last area of the heating zone 2, that is to say at the end of the product flow direction F, can be regulated by the extraction of cold water and by the admixture of hot water. The air temperature in the first area of the heating zone 2, that is to say at the start of the heating zone 2 in the product flow direction F, is regulated by a change in the through-flow rate through the heat exchangers 4, a water pump 14 with a frequency converter preferably being used.

During the drying method, the pastas are introduced from a first treatment zone 2 into a second treatment zone 3, the second treatment zone being the main dryer 3. The temperature in the first treatment zone, that is to say the heating zone 2, is on average lower than in the second treatment zone 3. The goods to be dried pass at a temperature of approximately 75° C. and 20% H2O into the main dryer 3, in which they are heated and dried continuously to approximately 86° C. and 12% H2O.

The main dryer 3 has a plurality of outer water/air heat exchangers 5 which are connected in series and through which the heating water flows counter to the product flow F. A plurality of fans 13 move the drying medium, the air, which is heated continuously by the series-connected outer heat exchangers 5. Small temperature jumps from one fan 13 to the next are advantageous, thus preventing the goods to be dried from sticking together, since minor temperature differences between the product temperature and the dew point occur in the following area of the dryer 1.

The heating water led into the main dryer 3 is generated from two streams:

1. The water of the return run of the main dryer 3 and
2. Admixture of fresh water.

The outer heat exchangers 5 in the second treatment zone, the main dryer 3, are dimensioned such that the required heating capacity can be exchanged by means of minor temperature differences between the water and air. The heating water flows, counter to the product flow F, at a temperature of between 80 and 120° C., preferably 102° C., through the series-connected outer water/air heat exchangers 5 of the main dryer 3. The drying medium, following the product flow F, is thereby heated continuously in the main dryer 3 from approximately 82° C. and 80% relative moisture to approximately 97° C. and 64% relative moisture. The series connection of the outer heat exchangers gives rise, in the case of a small flow of water, to a high temperature difference of the heating water. A relatively low return run temperature is thereby obtained.

The required fresh air is sucked directly out of the preceding heating zone 2 into the main dryer 3. At the end of the main dryer 3, the exhaust air 17 is sucked away from the dryer 1, 3 in a regulated way. The relative atmospheric moisture in the last area is thereby regulated. The heating water of the main dryer 3 is constantly circulated by means of a pump 15. The air temperature in the last element of the main dryer 3 is regulated by the extraction of cold water and the admixture of hot water. The air temperature in the first element of the main dryer 3 is regulated by a change in the through-flow rate through the heat exchangers 5 by means of a water pump 15 having a frequency converter.

In the apparatus according to the invention, heat recovery takes place in two stages. In the first stage, an air/water heat exchanger 6 is built into the return run of the water heating circuit of the heating zone 2. The exhaust air 17, 18 from the heating zone 2 and the main dryer 3 is conducted through this heat exchanger 6 and, by atmospheric moisture being condensed out, discharges heat for the most part to the heating water of the heating zone. Part of the heating capacity (approximately 70%) of the heating zone 2 is thereby recovered from the exhaust air 18 in an unregulated way. The return run water is heated from approximately 46° C. to approximately 72° C. via the heat exchanger 6 by the exhaust air 17 of the main dryer.

For heat recovery in the second stage, an additional water heating circuit is set up and circulated by means of an additional pump 16. To feed this heating circuit, an air/water heat exchanger 7 is built into the exhaust air line of the main dryer 3. This heat exchanger 7, too, utilizes mainly the condensation energy from the exhaust air 17. The forward run of the heating water in this circuit reaches approximately 84° C. in an unregulated way. By means of this water, the return run of the heating zone 2 is heated further from approximately 72° C. to approximately 80° C. in a regulated way via a water/water heat exchanger 8. In addition, by means of this circuit, the feed water for dough preparation is heated in a regulated way to the desired temperature with the aid of a water/water heat exchanger 9. The energy introduction required hitherto for heating the feed water is therefore dispensed with.

In addition, by means of this water heating circuit, the fresh air for the ventilation hood of the hanger is preheated in a regulated way. For this purpose, two additional outer water/air heat exchangers 10, 11 are provided, so that only about ¼ of the conventional amount of energy introduced has to be supplied from outside for the ventilation hood.

The return run of all the outer heat exchangers 8, 9, 10 is mixed together again and pumped through the outer exhaust air heat exchanger 7.

By virtue of the method and apparatus according to the invention, an energy saving in the overall plant 1 of approximately 60% can be achieved in terms of thermal heating capacity by the recovery of heat. The cost-effective components, such as, for example, heat exchangers, have small overall sizes, and they can therefore be integrated into the complete drying plant 1 in a simple way. As a result of the compact structural set-up of the plant, a small amount of space is required at the production location and only one exhaust air system is necessary. Furthermore, only one fresh air supply system is necessary for both drying zones, with the result that there is less pipework for the plant.

The invention claimed is:

1. A pasta convection-drying apparatus comprising:
   at least two treatment zones through which pasta is transported;
   at least one inner heat exchanger in at least a first of the treatment zones; and
   at least one outer heat exchanger;
   wherein the apparatus is configured such that exhaust air from the first of the treatment zones is supplied at least partially into a second of the treatment zones; and wherein the at least one inner heat exchanger is connected with the at least one outer heat exchanger such that energy obtainable from at least one of the treatment zones via the outer heat exchanger can be introduced into at least the first of the treatment zones,
   whereby drying condition parameters are selectable such that temperature and relative moisture of drying air may be controlled, such that, during operation, at least the surfaces of pasta which is being dried remain in a rubber-like state during convection drying of the pasta, the apparatus further comprising a plurality of inner heat exchangers arranged in series and configured such that, in operation, a fluid flows through the plurality of inner heat exchangers in a direction counter to the direction of pasta transportation.

2. The apparatus as claimed in claim 1, wherein at least one of the inner heat exchanger and the outer heat exchanger is a water/air heat exchanger.

3. The apparatus as claimed in claim 1, wherein the at least two treatment zones comprise a first heating zone and a second drying zone.

4. The apparatus as claimed in claim 2, wherein at least one inner heat exchanger is connected to at least one outer heat exchanger such that water flows from the inner heat exchanger to the outer heat exchanger.

5. The apparatus as claimed in claim 1, wherein the apparatus is configured such that exhaust air from at least one of the treatment zones is supplied to the at least one outer heat exchanger.

6. The apparatus as claimed in claim 1, wherein the apparatus is configured such that drying air is led past at least one inner heat exchanger, whereby the drying air is heated.

7. A method for convection drying of pasta, the method comprising the steps of:
   transporting the pasta through a first treatment zone of a pasta convection-drying apparatus, wherein the first treatment zone comprises at least one inner heat exchanger;
   subsequently transporting the pasta through a second treatment zone of the pasta convection-drying apparatus, wherein an average temperature in the second treatment zone is higher than an average temperature in the first treatment zone;
   supplying exhaust air from the first treatment zone at least partially into the second treatment zone;
   controlling a relative atmospheric moisture of a last area, in a direction of pasta transportation, of the first treatment zone by sucking away exhaust air from the first treatment zone in a regulated way;
   obtaining energy obtained from exhaust air of the first and/or the second treatment zone in at least one outer heat exchanger;
   introducing the obtained energy at least partially into the first treatment zone via the at least one inner heat exchanger;

whereby drying condition parameters are selectable, such that temperature and relative moisture of drying air may be controlled, such that at least the surfaces of the pasta remain in a rubber-like state during convection drying of the pasta, wherein, in the first and/or the second treatment zone, inner heat exchangers are connected in series and a fluid flows through them in a direction counter to the direction of pasta transportation.

8. The method as claimed in claim 7, comprising the further step of heating drying air by leading the drying air past the at least one or a further inner heat exchanger arranged in one of the first and the second treatment zones.

9. The method as claimed in claim 7, wherein drying condition parameters are selected such that through the first treatment zone, in the direction of pasta transportation, temperature of the drying air rises continuously, while absolute moisture of the drying air also rises; and temperature of the pasta rises and a water content of the pasta falls.

10. The method as claimed in claim 7, wherein drying condition parameters are selected such that through the second treatment zone, in the direction of pasta transportation, temperature of the drying medium air is varied and rises continuously, while absolute moisture of the drying air also rises;

the temperature of the pasta rises; and and a water content of the pasta falls.

11. The method as claimed in claim 7, wherein the inner heat exchanger is a water/air heat exchanger and hotter water is admixed to water flowing to the inner water/air heat exchanger.

12. The method as claimed in claim 7, wherein the inner heat exchanger is a water/air heat exchanger and energy present in the first and/or the second treatment zone heats feed water of the at least one inner heat exchanger and/or of at least one further inner heat exchanger in the second and/or in further treatment zones of the pasta dryer.

13. The method as claimed in claim 7, comprising the further step of controlling a relative atmospheric moisture of a last area, in the direction of pasta transportation, of the second treatment zone by sucking away exhaust air from the second treatment zone in a regulated way.

\* \* \* \* \*